Feb. 24, 1925.  
P. B. NEWKIRK  
1,527,695  
POWER TRANSMISSION MECHANISM FOR MOTOR VEHICLES  
Filed Nov. 24, 1922   3 Sheets-Sheet 1
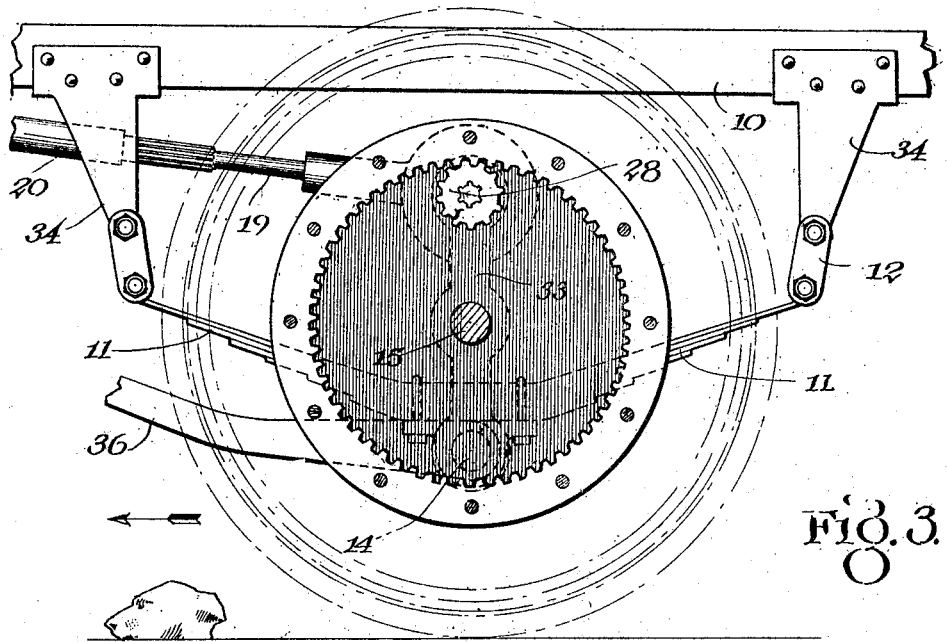
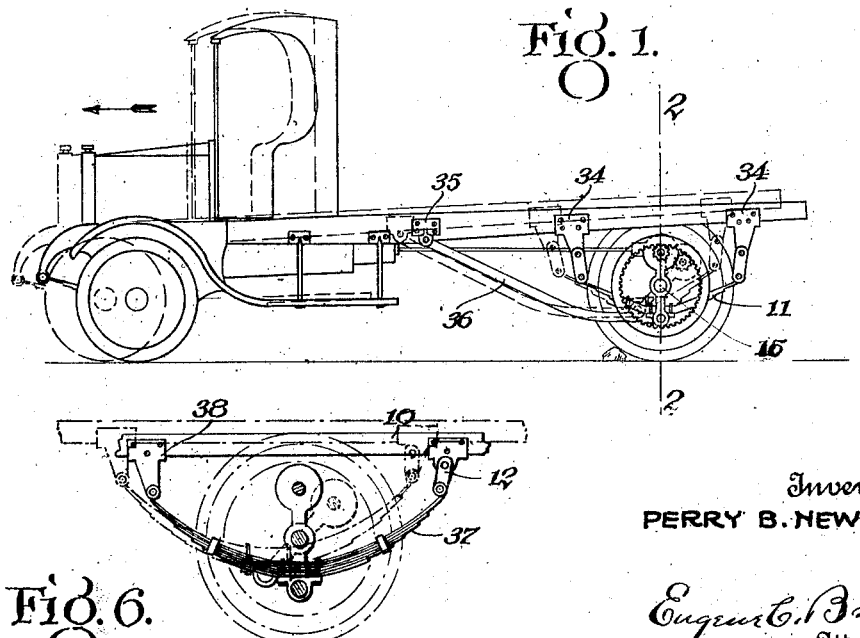
Inventor  
PERRY B. NEWKIRK.
Eugene C. Brown  
Attorney

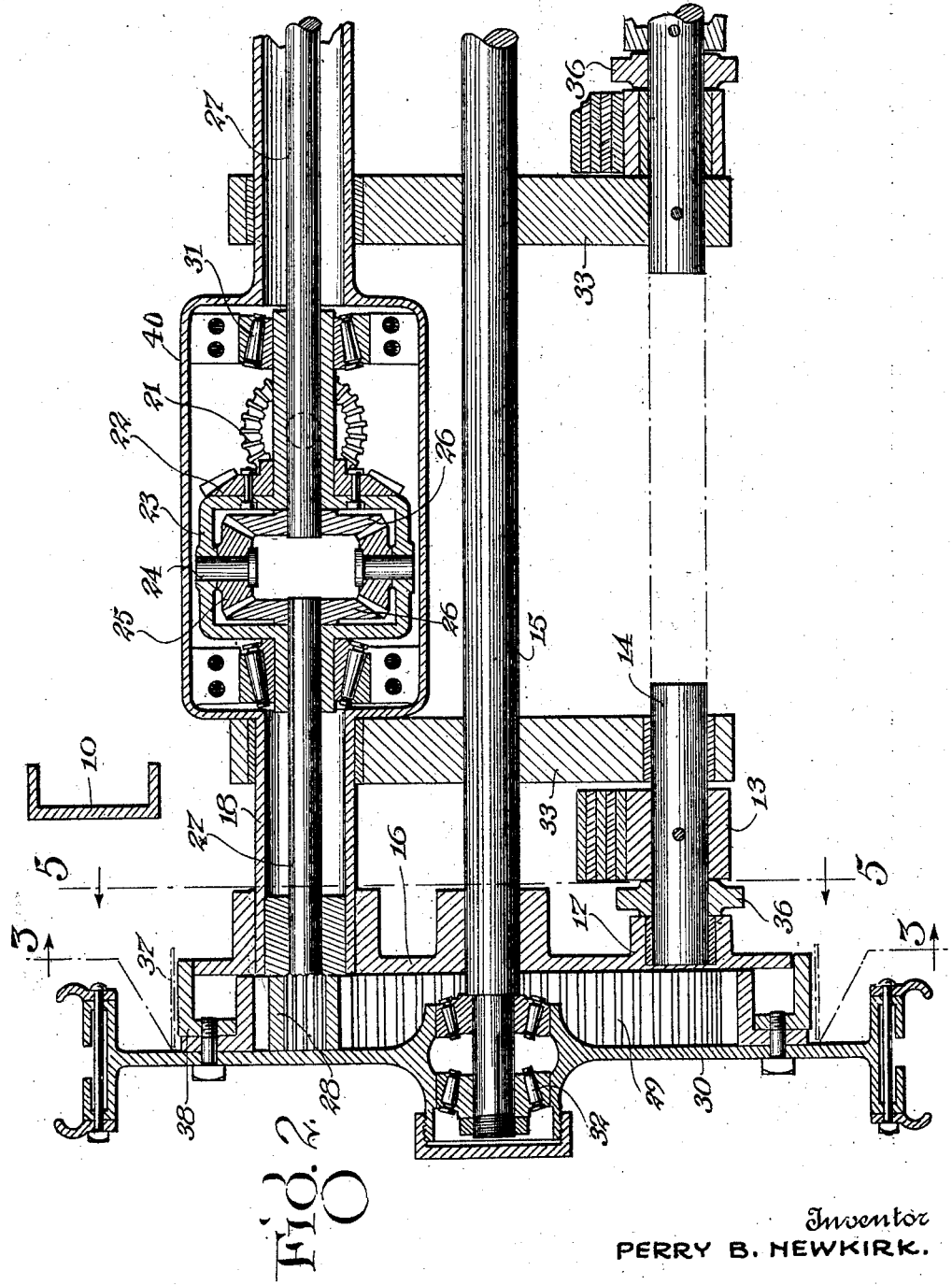

Feb. 24, 1925.    1,527,695
P. B. NEWKIRK
POWER TRANSMISSION MECHANISM FOR MOTOR VEHICLES
Filed Nov. 24, 1922    3 Sheets-Sheet 3

Inventor
PERRY B. NEWKIRK

Eugene C. Brown
Attorney

Patented Feb. 24, 1925.

1,527,695

UNITED STATES PATENT OFFICE.

PERRY B. NEWKIRK, OF SEATTLE, WASHINGTON.

POWER-TRANSMISSION MECHANISM FOR MOTOR VEHICLES.

Application filed November 24, 1922. Serial No. 603,107.

*To all whom it may concern:*

Be it known that I, PERRY B. NEWKIRK, a citizen of the United States, residing at Seattle, in the county of King and State of Washington, have invented certain new and useful Improvements in Power-Transmission Mechanism for Motor Vehicles, of which the following is a specification.

My invention relates to improvements in drive mechanisms for vehicles, and has for its main purpose an improvement on the motor vehicle transmission mechanism for which a patent was granted to me on May 23, 1922, bearing Number 1,417,406.
In common with the aforementioned patent, the present invention contemplates the provision of means associated with the modern type of motor vehicle whereby the weight of the vehicle body, together with its load, is utilized to assist in the forward or rearward turning of the traction wheels when an obstacle or uneven road surface is encountered.

The improvement embodied in the present invention resides in the provision of means whereby the tail shaft of the motor vehicle will be kept very closely in alinement with the crank shaft of the vehicle engine, so that the universal joint will operate to transmit the revolutions of the crank shaft to the tail shaft in a more nearly uniform manner than is possible where the crank and tail shafts are at a considerable angle.

The invention embodies the same general mechanical principles, and has the same advantages as those embodied and obtained by the invention of the before mentioned patent together with those above enumerated, and certain others which will be hereinafter apparent.

In the following description, I shall refer to the accompanying drawings, in which:—

Fig. 1 is a side elevation of a motor truck equipped with my driving mechanism.
Fig. 2 is a partial transverse vertical sectional view on the line 2—2 of Fig. 1.

Fig. 3 is a sectional view on the line 3—3 of Fig. 2.

Fig. 6 is a detail view, partly diagrammatic, showing a modified form of spring suspension for the vehicle body.

Figure 4:
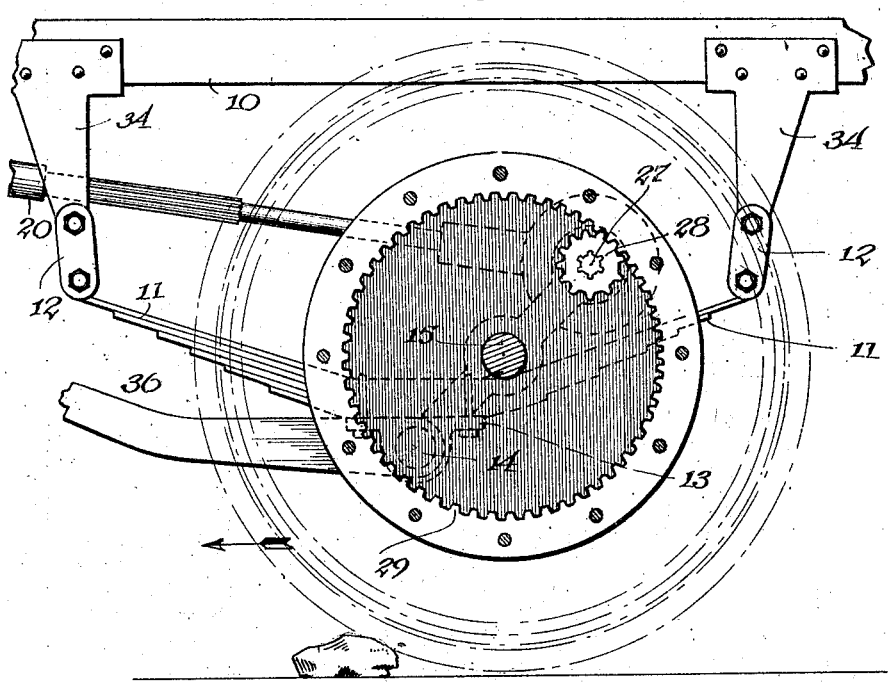
Fig. 4 is a similar view showing the relative movement of the live axle and vehicle body with respect to the dead axle and wheels when an obstacle is encountered.
Figure 5:
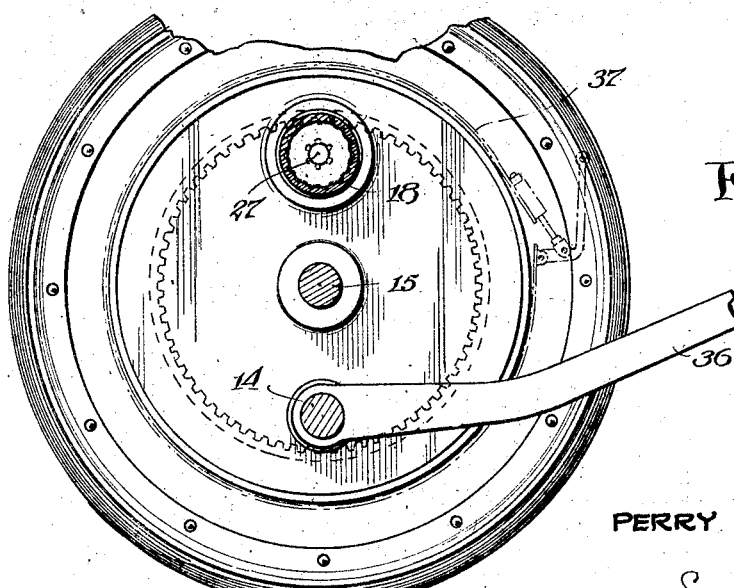
Fig. 5 is a sectional view on the line 5—5 of Fig. 2.

The rear end of the frame 10 of the truck body or chassis is supported upon the main springs 11 by means of shackles 12, and these springs are rigidly secured at their centers to spring seats 13, which carry stub shafts 14. At 15 is a dead axle, and on this dead axle, at each end thereof, is swingingly mounted an arm 16 provided at one end with a bearing 17 engaging an end of the respective stub shaft 14. The other end of this arm has mounted therein one end of a live axle housing 18. It is to be noted that the spring seat 13 is preferably beneath the axle 15, and that the live axle housing is above the axle 15. Journaled in this live axle housing is the rear end of the rear section 19 of the vehicle tail shaft, this rear section telescoping in the front section 20 of such tail shaft, and being provided with the usual sliding key connection with the said front section, so that as this front section is rotated, the rear section will be in like manner rotated. Within the axle housing 18, the rear section 19 is provided with a bevel gear 21, which meshes with a bevel gear 22 fixed to a differential frame 23 carrying stub shafts 24 whereon are the bevel gears 25. These bevel gears mesh with the bevel gears 26 carried respectively on the right and left hand sections of the live axle or as it is termed, the drive shaft or jack shaft 27. On the outer end of each section of the shaft 27 is a gear 28 which meshes with an internal gear 29 fixed to the traction wheel 30. The differential frame 23 is supported within the housing 40 by means of the usual roller bearings 31, and similarly roller bearings 32 of the usual character supporting the wheel 30, so that it may revolve freely on the dead axle 15. In order to assist the arm 16, other arms 33 may also be provided, and these arms serve the purpose of supporting the inner ends of the stub shafts 14, the arms being pivoted on the dead axle 15 intermediate their ends, and receiving in their upper ends the respective ends of the housing 18. In order to prevent improper stresses being exerted on the springs 11, the vehicle frame or chassis is provided, forward of the spring hangers 34, with brackets 35 whereto are pivoted the ends of links 36, which have eyes at their free ends wherein are received the respective shafts 14.

It will be observed from Fig. 2 that the shaft 14 may either be made as a separate stub shaft or may be made as a continuous shaft reaching from one side of the machine to the other, but it is generally preferred to make these shafts as short stub shafts so that a free space is left beneath the center of the dead axle 15.

In the form of the device shown in Fig. 6, it will be noted that the forward shackle 12 is omitted, and in this form the forward end of an arcuate leaf spring 37 is connected directly to spring bracket 38 fixed on the frame 10.

The transmission of power from the engine through the power or tail shaft 20, and its driving pinion or gear 21, and through the differential transmission to the jack shafts sections 27 will be understood by engineers and those familiar with motor vehicles without further explanation.

It will be noted that in this construction the location of the differential housing and the jack shaft sections above the dead axle 15 places the rear end of the power or tail shaft in such position that it is substantially in alinement with the crank shaft of the engine, being nearly parallel to the frame 10.

In the operation of my improved axle construction it will be seen that the action is closely analogous to that described in my heretofore mentioned patent. When the vehicle is standing still, or is pulling a light load over a good road, the brackets 16 will extend vertically, and the driving pinions 28 will be in the position indicated in Fig. 3, that is to say, directly above the dead axle 15. If, however, a hill is reached, or the truck enters a rough and muddy road, or encounters an obstruction, the traction wheels will immediately be retarded, resulting in a relative movement between the parts, the power transmitted from the engine causing the pinions 28 to gradually move rearwardly and downwardly over the teeth of the internal gear 29, which constitutes a rack for the pinion, due to its retarding movement, and as a result the entire weight of the truck body and its load are moved forward and upward with respect to the dead axle to a position such as is indicated in Fig. 4, and in dotted lines in Fig. 1. This forward and upward movement may continue until the springs 11 engage the underside of the dead axle. The weight has thus been moved forwardly with respect to the obstacle, and tends to assist by this advantageous position in moving the truck over the obstruction. Again, the weight of the truck and its load which have been transferred to the pinions 28 by reason of the upward swinging of the supports 13 about the dead axle, tends to cause the pinions to move upwardly again over the teeth of the internal gear, and as this movement is in the proper direction, to assist the motive power in rolling the wheels over the obstruction. At this point it will be noted that by reason of the fact that the pinions are above the dead axle, the lever arm from the pinions to the obstruction is longer than is possible under conditions where the pinion is below the dead axle, and consequently, the power exerted by such pinion is more effectively applied in the present instance than in the arrangement set forth in my previously patented device. This action of the weight of the load in assisting to cause the wheels to climb out of the rut, or rise over the obstruction, as the case may be, may be likened to the action of a lifting jack applied to one of the spokes of the wheel which lies in an upwardly and rearwardly inclined position with respect to the dead axle. It will now be evident that whenever the rear wheels resist the turning movement by reason of some exterior resistance, the turning moment devolving upon the same will be increased by the shifting of the weight of the vehicle to the new position just referred to. Such new position will be largely governed by the amount of resistance so that the power added will be proportionate in degree to the resistance encountered.

As in the previous invention, a consideration of the actions and reactions which take place, as above described, makes it evident that a sudden application of the brake lever sufficient to cause the brake band 37 to grip the brake drum 38 and suddenly retard the movement of the traction wheels, or likewise cause the driving pinions 28 to climb downwardly along the teeth of the internal gear rings 29, and in so doing the power of the engine will be absorbed in lifting the truck body and its load, thus relieving the machine of any sudden torque or hammer blows. No part of the driving mechanism of the motor, clutch, transmission, universal joint, differential or driving gears can receive a sudden torque strain. With the motor idle, and the truck in gear the clutch may be suddenly applied without stalling the motor and without danger of stripping the gears. As a result of this almost complete absorption of shocks, trucks provided with solid tires are subject to less vibration than ordinary trucks equipped with pneumatic tires. Furthermore, on account of the yielding movement permitted to the load, slippage of the tires on the road is practically eliminated. Thus the foregoing, and other advantages obtained from the construction shown in my prior patent above referred to, are inherent in the present device, and in addition the arrangement of the parts is such that the power is more effectively applied, and the tail or power shaft is kept more nearly in alinement with the crank shaft of the engine.

I have described in detail the particular construction illustrated in the accompanying drawings for the purpose of clearly disclosing the embodiment of my invention, but it will be evident to engineers that various changes and modifications may be made without departing from the essential principles thereof.

I claim:

1. Transmission mechanism for motor vehicles comprising a dead axle having an end bearing, a traction wheel thereon having a concentric gear, a live axle or jack shaft located above said dead axle and provided with a pinion in mesh with said gear, a housing having bearings in which said live axle is mounted, a swinging mounting journalled intermediate its ends upon said dead axle and at its upper end upon said housing, a vehicle support having the lower end of said swinging mounting journalled thereon, and means to restrain said mounting from longitudinal movement with respect to the body of the vehicle.

2. A driving axle construction for motor vehicles, comprising a dead axle having end bearings, traction wheels mounted thereon each having a concentric gear, a jack shaft carrying pinions in mesh with said gears, a jack shaft housing having bearings in which said jack shaft is mounted, said jack shaft being located above said dead axle, a swinging mounting between said axle and said housing rotatably carrying the housing whereby to permit the latter to move in an arcuate path upon opposite sides of the axle, extensions on said mounting projecting downwardly below said axle, and a vehicle body mounted upon and secured to said extensions whereby the housing is maintained in parallel relation to the body.

3. A driving axle construction for motor vehicles comprising a dead axle having end bearings, traction wheels mounted thereon each having concentric gear, a jack shaft carrying pinions in mesh with the respective gears, a housing having bearings in which said jack shaft is mounted, said jack shaft being located above the dead axle, a swinging mounting between said axle and said housing rotatably carrying the housing whereby to permit the latter to move in an arcuate path upon opposite sides of the vehicle, extensions projecting downwardly from the mounting below said dead axle, vehicle springs secured to the lower ends of said extensions, and a vehicle body mounted upon said springs.

4. A driving axle construction for motor vehicles, comprising a dead axle having end bearings, traction wheels mounted thereon each having a concentric gear, a jack shaft carrying pinions in mesh with the respective gears, a housing having bearings in which said jack shaft is mounted, said jack shaft being located above the dead axle, a swinging mounting between said axle and said housing rotatably carrying the housing whereby to permit the latter to move in an arcuate path upon the opposite sides of the vehicle, extensions projecting downwardly from the mounting below said dead axle, stub shafts journalled in the lower ends of said extensions, vehicle springs rigidly secured to said stub shafts, and a vehicle body mounted upon said springs.

5. A driving axle construction for motor vehicles, comprising a dead axle having end bearings, traction wheels mounted thereon each having a concentric gear, a jack shaft carrying pinions in mesh with the respective gears, a housing having bearings in which said jack shaft is mounted, said jack shaft being located above the dead axle, a swinging mounting between the said axle and said housing rotatably carrying the housing whereby to permit the latter to move in an arcuate path upon the opposite sides of the vehicle, extensions projecting downwardly from the mounting below said dead axle, stub shafts journalled in the lower ends of said extensions, vehicle springs rigidly secured to said stub shafts, a vehicle body mounted upon said springs, and links connecting said stub shafts with the body of the vehicle whereby to restrain the bodily movement of the stub shafts longitudinally of the vehicle.

6. A driving axle construction for motor vehicles, comprising a dead axle having end bearings, traction wheels mounted thereon, each having concentric gears, a drive shaft located above said dead axle and carrying pinions in mesh with said gears, a housing in which said shaft is mounted, a swinging mounting between said axle and said shaft rotatable on said axle and rotatably carrying said housing, and a load-carrying axle swingably mounted upon the dead axle.

In testimony whereof I affix my signature.

PERRY B. NEWKIRK.